(12) United States Patent
Castellotto

(10) Patent No.: US 12,422,521 B2
(45) Date of Patent: Sep. 23, 2025

(54) WEATHER STATION FOR SENSOR CALIBRATION

(71) Applicant: GM Cruise Holdings LLC, San Francisco, CA (US)

(72) Inventor: Luca Castellotto, Oakland, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 144 days.

(21) Appl. No.: 18/093,306

(22) Filed: Jan. 4, 2023

(65) Prior Publication Data

US 2024/0219519 A1 Jul. 4, 2024

(51) Int. Cl.
| | |
|---|---|
| *G01S 7/00* | (2006.01) |
| *G01S 7/40* | (2006.01) |
| *G01S 13/931* | (2020.01) |
| *G01W 1/02* | (2006.01) |

(52) U.S. Cl.
CPC .............. *G01S 7/40* (2013.01); *G01S 13/931* (2013.01); *G01W 1/02* (2013.01); *B60W 2420/00* (2013.01); *B60W 2555/20* (2020.02)

(58) Field of Classification Search
CPC .......... G01S 7/40; G01S 13/931; G01W 1/02; B60W 2555/20; B60W 2420/00
USPC .......................................................... 701/33.1
See application file for complete search history.

(56) References Cited

U.S. PATENT DOCUMENTS

| | | | | |
|---|---|---|---|---|
| 11,567,503 | B1* | 1/2023 | Roy ....................... | G05D 1/028 |
| 2020/0019160 | A1* | 1/2020 | McArthur ........... | G01S 7/52004 |
| 2021/0191399 | A1* | 6/2021 | Verghese ............... | G06V 10/44 |
| 2022/0299446 | A1* | 9/2022 | Tuononen .............. | G01N 21/55 |
| 2023/0152489 | A1* | 5/2023 | Dormody ............. | G01L 27/002 |
| | | | | 702/3 |
| 2023/0236317 | A1* | 7/2023 | Fina ...................... | G01S 13/931 |
| | | | | 342/26 B |

* cited by examiner

*Primary Examiner* — Mahmoud S Ismail
(74) *Attorney, Agent, or Firm* — Honigman LLP; Matthew H. Szalach; Jonathan P. O'Brien

(57) ABSTRACT

The present disclosure generally relates to sensor calibration and more specifically, to sensor calibration using weather data. In some aspects, the present disclosure provides a process for receiving a set of weather data from a weather measurement station disposed within a calibration environment, determining if a predetermined weather condition is indicated by the set of weather data, and collecting, using one or more AV sensors, a set of sensor data within the calibration environment, if the predetermined weather condition is indicated by the set of weather data. Systems and machine-readable media are also provided.

14 Claims, 6 Drawing Sheets

WEATHER STATION FOR SENSOR CALIBRATION

BACKGROUND

1. Technical Field

The present disclosure generally relates to sensor calibration, more specifically, to sensor calibration using weather data.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide a safe and efficient transportation. Such tasks may require the collection and processing of large quantities of data using various sensor types, including but not limited to cameras and/or Light Detection and Ranging (LiDAR) sensors disposed on the AV.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
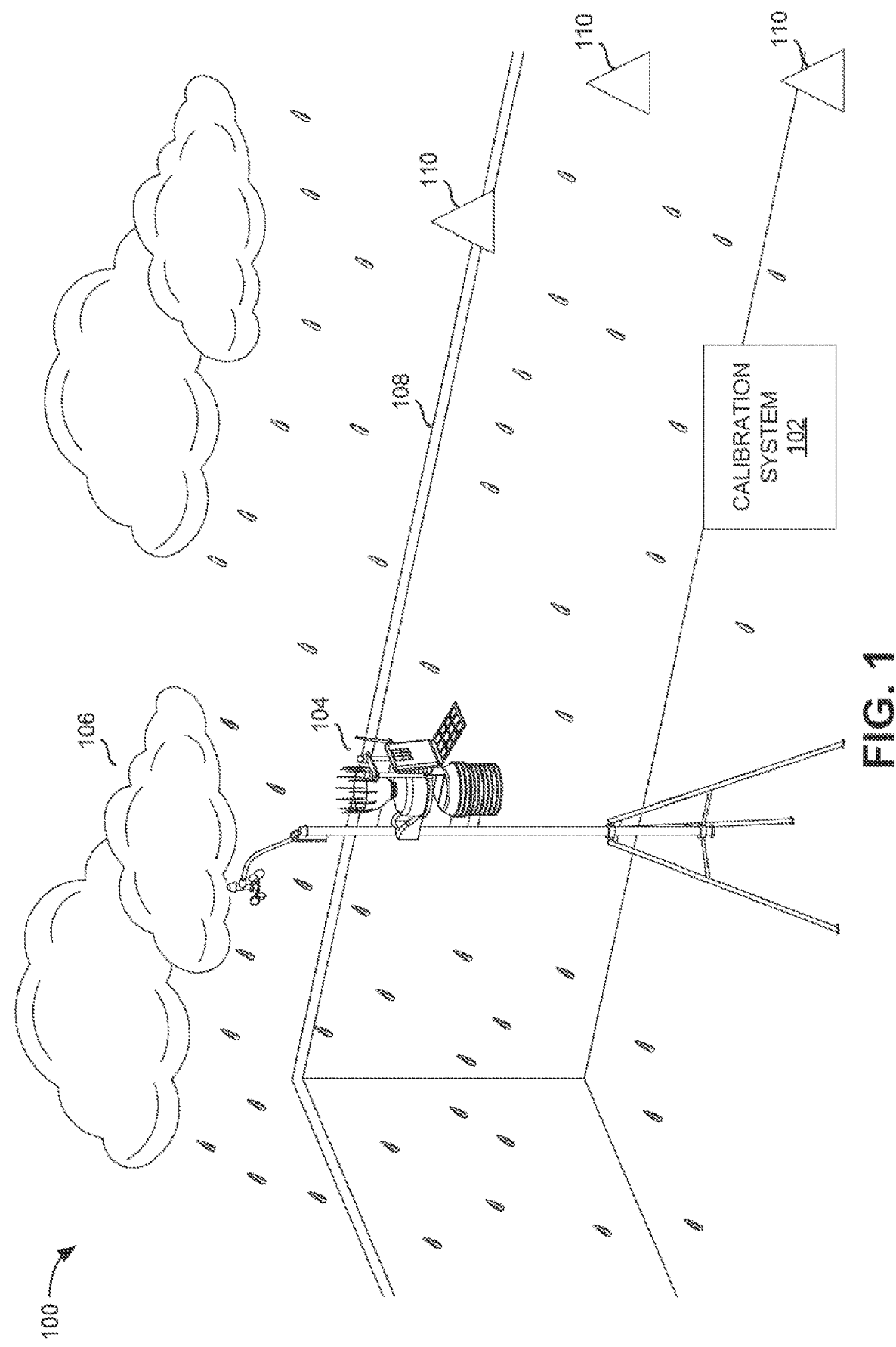
FIG. 1 illustrates an example system for implementing sensor calibration using weather data, according to some aspects of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs), also known as self-driving cars, driverless vehicles, and robotic vehicles, are vehicles that use sensors to sense the environment and move without human input. Automation technology enables the AVs to drive on roadways and to perceive the surrounding environment accurately and quickly, including obstacles, signs, and traffic lights. In some cases, AVs can be used to pick up passengers and drive the passengers to selected destinations.

Autonomous vehicles may contain multiple sensor systems (e.g., sensor systems 504, 506 and 508 which will be discussed in further detail in FIG. 5 below) including, but not limited to one or more AV sensors, including, but not limited to one or more: Light Detection and Ranging (LiDAR) sensor/s, camera sensor/s, Radio Detection and Ranging (RADAR) sensor/s, and the like. When used to support AV applications, sensor systems are required to operate in different environments, such as in different weather conditions. However, various sensor systems (or sensor types) may perform differently under different operating conditions, such as under different weather conditions.

Before deployment, AV sensor systems may be calibrated based on the conditions of the AV's surrounding environment. In some cases, software engineers may calibrate AV sensor systems in indoor environments (e.g., a lab environment) without accounting for weather conditions that an AV may encounter. However, understanding the performance of the different AV sensor systems in different weather conditions including, but not limited to, rain, fog, snow, wind and/or sun, etc., is necessary to optimize the weighting of each AV sensor system. For example, during a rainy weather condition, LiDAR sensor performance may be more adversely impacted than a camera sensor performance. As a result, the perception stack may give greater weight (or significance) to the camera sensor data, as compared to the LiDAR sensor data. Furthermore, different measurement parameters within a particular sensor may be impacted differently in various weather conditions. For example, camera sensor parameters, such as contrast or signal level may differ more greatly in foggy conditions, as compared to LiDAR sensor parameters, such as, intensity uniformity or distance reporting accuracy. By way of further example, radar sensor parameters, such as spatial accuracy, distance accuracy, and/or noise, may vary differently under rainy conditions as compared with deviations for sensor parameters for other sensor types (e.g., camera or LiDAR). By knowing sensor performance under certain operating conditions, the perception stack may weigh or optimize the use of sensor data collected by certain sensory types, e.g., based upon their performance metrics under different weather conditions.

Aspects of the disclosed invention provide solutions relating to sensor calibration and, more specifically, to sensor calibration in different weather conditions. For example, a calibration system and a weather station may be at a fixed location (e.g., rooftop) where they are exposed to various weather conditions. The calibration system may include AV sensor systems and a computer system to communicate with the weather station. In addition, the calibration system's sensor systems may be pointed to fixed targets (i.e., targets at a fixed location) that correlate with the type of sensor system (e.g., LiDAR may be pointed to a reflector or a fiducial target, camera may be pointed to an optical calibration target, etc.). The calibration system may communicate with the weather station to determine when to begin collecting sensor data (which will be discussed in further detail in FIG. 1 below). For example, a predetermined weather condition such as a certain amount of rainfall may determine when the calibration system should start collecting sensor performance data.

FIG. 1 illustrates an example of an environment (also calibration environment) 100 in which a sensor calibration process, using weather data, may be implemented. Environment 100 includes a calibration system 102, weather station (also weather measurement station) 104, weather conditions 106, location 108, and one or more calibration targets (or targets) 110. Calibration system 102 (which will be discussed in further detail in FIG. 2 below) may include one or more AV sensor systems including, but not limited to, LiDAR sensors, RADAR sensors, and/or camera sensors, etc. Calibration system 102 may also include a computer system to communicate (e.g., send and receive data) with weather station 104.

In some cases, calibration system 102 and weather station 104 may be placed on a location 108 such as a rooftop or any location which may be potentially impacted by one or more weather conditions 106. In some implementations, the chosen location 108 can be representative of conditions (weather conditions) under which various AV sensors are likely to operate.

Weather station 104 may monitor weather conditions 106 including, but not limited to detecting certain weather events, such as rain, fog, snow, sun, hail, lightning, humidity, temperature, cloudiness, tornado/s, hurricane/s or some combination thereof. In operation, calibration system 102 may receive weather data from weather station 104 at various time intervals (e.g., every 5 minutes, 15 minutes, 30 minutes, hour, etc.) or continuously. The calibration system 102 can include a software script with one or more predetermined weather conditions 106 that must occur for the AV sensors to initialize or turn on and begin collecting sensor data. For example, the software script may include a predetermined weather condition 106 that indicates that rain must be at least a certain amount of rainfall (e.g., 2 inches of depth), or have occurred for a minimum amount of time (e.g., 20 minutes of continuous downpour). Additional examples may include, but are not limited to monitoring conditions relating to: a minimum wind velocity, temperature range, barometric pressure, wind chill, dew point, meteorological optical range (MOR), humidity level, cloudiness, and/or rainfall over a given time interval, such as a 15 min interval, etc. By way of further example, predetermined weather conditions may also specify a rain droplet size, snowfall, and/or solar conditions across various spectra, including but not limited to: ultra-violet (UV), solar radiation, brightness (lux), lunar lighting conditions, and/or moon phases, etc.

In some cases, a subset of the one or more AV sensors may begin collecting sensor data (e.g., some AV sensors may have different predetermined weather conditions 106 than others). Those skilled in the art will appreciate additional examples of weather conditions 106. Once the predetermined weather condition 106 is met, calibration system 102 may initialize one or more sensor systems which may be pointed to a corresponding target 110 that is of a type meant for a particular sensor system. The sensor systems within calibration system 102 may be pointed at targets 110 which may be placed at fixed locations in the environment 100 (i.e., at fixed distances away from each sensor system). For example, targets 110 may include one or more reflectors or fiducials for a LiDAR sensor. In another example, targets 110 may include one or more optical calibration targets for a camera sensor.

After sensor systems within calibration system 102 collect sensor data during a weather condition 106 (e.g., the predetermined weather condition is indicated by calibration system 102), the calibration system 102 may utilize the sensor data to determine a performance of each sensor type and/or of various sensor parameters within a given sensor type, based on the operating conditions. By way of example, calibration system 102 may be configured to compare the sensor data with a baseline set of sensor data. In other words, the sensor data during a weather condition 106 may be compared with sensor data when there is no weather condition 106 present. The calibration system 102 can calculate a confidence score, or a performance metric for a sensor system's performance during the weather condition 106. For example, calibration system 102 may determine how well the LiDAR sensor performed in fog, the camera sensor in rain, the radar sensor in snow, etc. Furthermore, within a particular sensor, some measurement parameters may be affected by a weather condition 106 while others remain unaffected. For example, LiDAR sensor performance metrics may include, but are not limited to, intensity value, consistency of distance reporting, uniformity, double reflections, and interference. Camera sensor performance metrics may include, but are not limited to, resolution of a slanted edge, resolution of spilled coins targets, and edge sharpness (e.g., differentiating between edges of different objects).

The sensor data collected by calibration system 102 may be used to optimize the AV perception stack's (e.g., perception stack 512 which will be discussed in further detail in FIG. 5 below) weighting of each sensor system based upon their performance metrics in different weather conditions 106. For example, in rain, a LiDAR sensor may see "ghost" objects or false objects in the surrounding environment or measure incorrect distances of objects from the calibration system 102. The AV perception stack may consequently have a lower confidence score, or weight applied to a LiDAR sensor.

Figure 2:
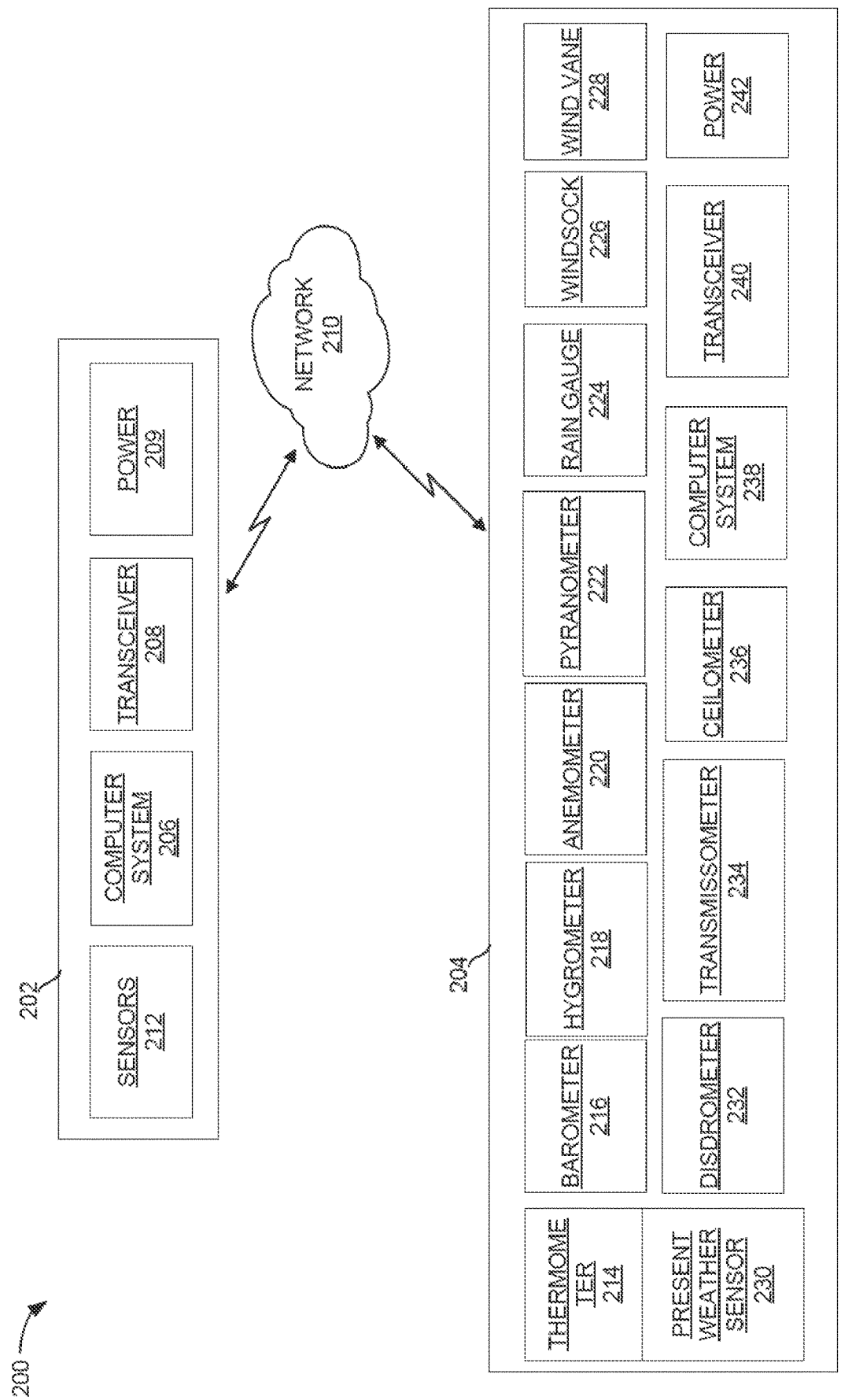
FIG. 2 illustrates another example system for implementing sensor calibration using weather data, according to some aspects of the present disclosure.

FIG. 2 illustrates another example of an environment 200 in which a sensor calibration using the weather data process of the disclosed technology may be implemented. Environment 200 includes a calibration system 202, weather station 204, and network 210. Calibration system 202 includes one or more sensors 212, computer system 206, transceiver 208, and power 209 (e.g., battery or wired power). Weather station 204 may include one or more weather instruments including, but not limited to, thermometer 214, barometer 216, hygrometer 218, anemometer 220, pyranometer 222, rain gauge 224, windsock 226, wind vane 228, present weather sensor 230, disdrometer 232, transmissometer 234, ceilometer 236. In addition, weather station 204 may include a computer system 238, transceiver 240, and power 242. Computer system 206 and computer system 238 may exchange information (i.e., send and receive data) over a network 210 (e.g., WIFI and cellular as discussed in further detail in FIG. 5 below), through transceiver 208 and transceiver 240. In some cases, network 210 may have internet connectivity. Transceiver 208 and transceiver 240 may comprise a WIFI antenna, cellular antenna, Bluetooth®, or a combination thereof. As discussed above in FIG. 1, computer system 206 may receive weather data from weather station 204 (e.g., computer system 238). The calibration system 202 may include a software script with one or more predetermined weather conditions that must occur for sensors 212 to initialize or turn on and begin collecting sensor data. In some cases, calibration system 202 may initialize or turn on and begin collecting sensor data on a periodic basis or at time intervals (e.g., a predetermined weather condition does not need to occur for sensors 212 to begin collecting sensor data). In some instances, calibration system 202 may store sensor data on computer system 206 or transmit the sensor data to an external device (e.g., cloud or another computer system not shown).

Weather station 204 may include power 242 which may have solar panels and a battery to store solar energy. Thermometer 214 can measure the air temperature of environment 200. Barometer 216 can measure air pressure, or atmospheric pressure of environment 200. Hygrometer 218 can measure the amount of water vapor, or humidity of environment 200. Anemometer 220 can measure wind speed and wind direction of environment 200. Pyranometer 222 can measure solar radiation (e.g., the amount of solar radiation the sun produces) in environment 200. Rain gauge 224 can measure the amount of precipitation over time (e.g., the depth of rain) in environment 200. Windsock 226 and wind vane 228 can measure wind direction in environment 200. Present weather sensor 230 may be a laser-based sensor that measures precipitation and visibility by determining the size and velocity of water droplets in the air in environment 200. Disdrometer 232 can measure drop size distribution and velocity of falling hydrometeors (i.e., particulates of liquid or solid water) in environment 200. Transmissometer 234 can measure visibility of environment 200. Ceilometer 236 can measure the height of cloud bases and overall cloud thickness of environment 200.

Figure 3:
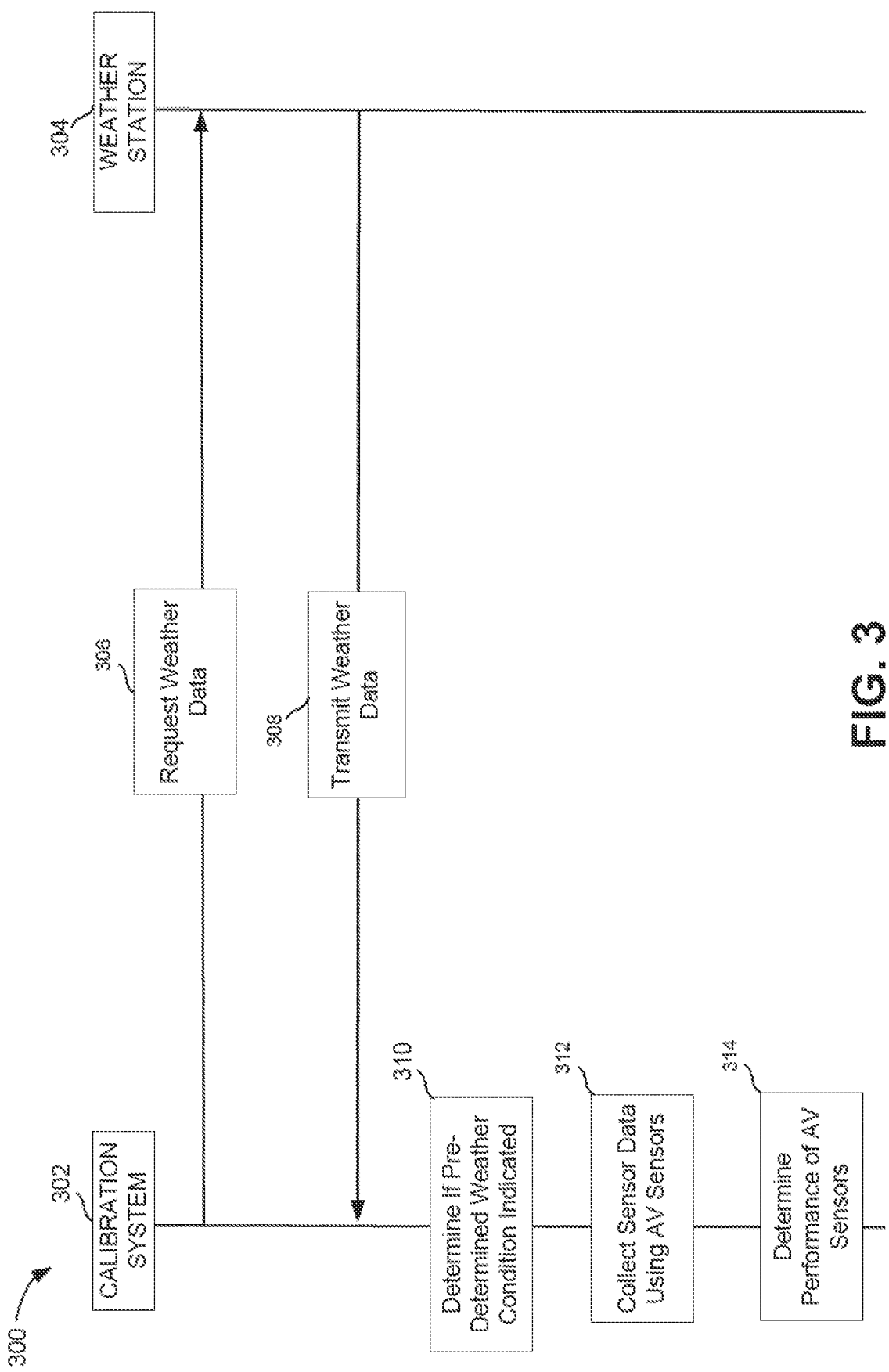
FIG. 3 illustrates an example of a communication process between a calibration system and a weather station, according to some aspects of the present disclosure.

FIG. 3 illustrates an example communication process 300 between a calibration system 302 and a weather station 304, according to some aspects of the present disclosure. The process 300 begins with step 306 where calibration system 302 requests weather data from weather station 304. Calibration system 302 may continuously or intermittently (e.g., during set time intervals) request weather data from weather station 304. Next, the process 300 continues step 308 where weather station 304 transmits weather data to calibration system 302. Next, the process 300 continues to step 310 where calibration system 302 determines if a predetermined weather condition is indicated by the weather data received at step 308. For example, calibration system 302 may include one or more predetermined weather conditions such as a minimum amount of rainfall, temperature, wind velocity, etc. that must occur prior to calibration system 302 initializing one or more sensors to begin collecting sensor data. As discussed above in FIG. 1, each sensor may have different predetermined weather conditions that indicate when to begin collecting sensor data. Next, the process 300 continues to step 312 where calibration system 302 collects AV sensor data using one or more targets at fixed locations. Each AV sensor in calibration system 302 may be pointed at a specific target (e.g., a target type that correlates with the type of sensor) which may be at fixed locations, or fixed distances away from each sensor in the environment. Next, the process 300 continues to step 314 where calibration system 302 determines a performance metric for at least one AV sensor. Calibration system 302 may include a computer system with stored sensor data indicating performance of each AV sensor in a baseline environment, or an environment where there is no predetermined weather condition present. As a result, calibration system 302 may compare the sensor data in a baseline environment with the sensor data in an environment where the predetermined weather condition is indicated by the weather data from weather station 304. Calibration system 302 may then determine a performance metric for the one or more AV sensors which may indicate how each sensor performance has been affected under the predetermined weather condition.

Figure 4:
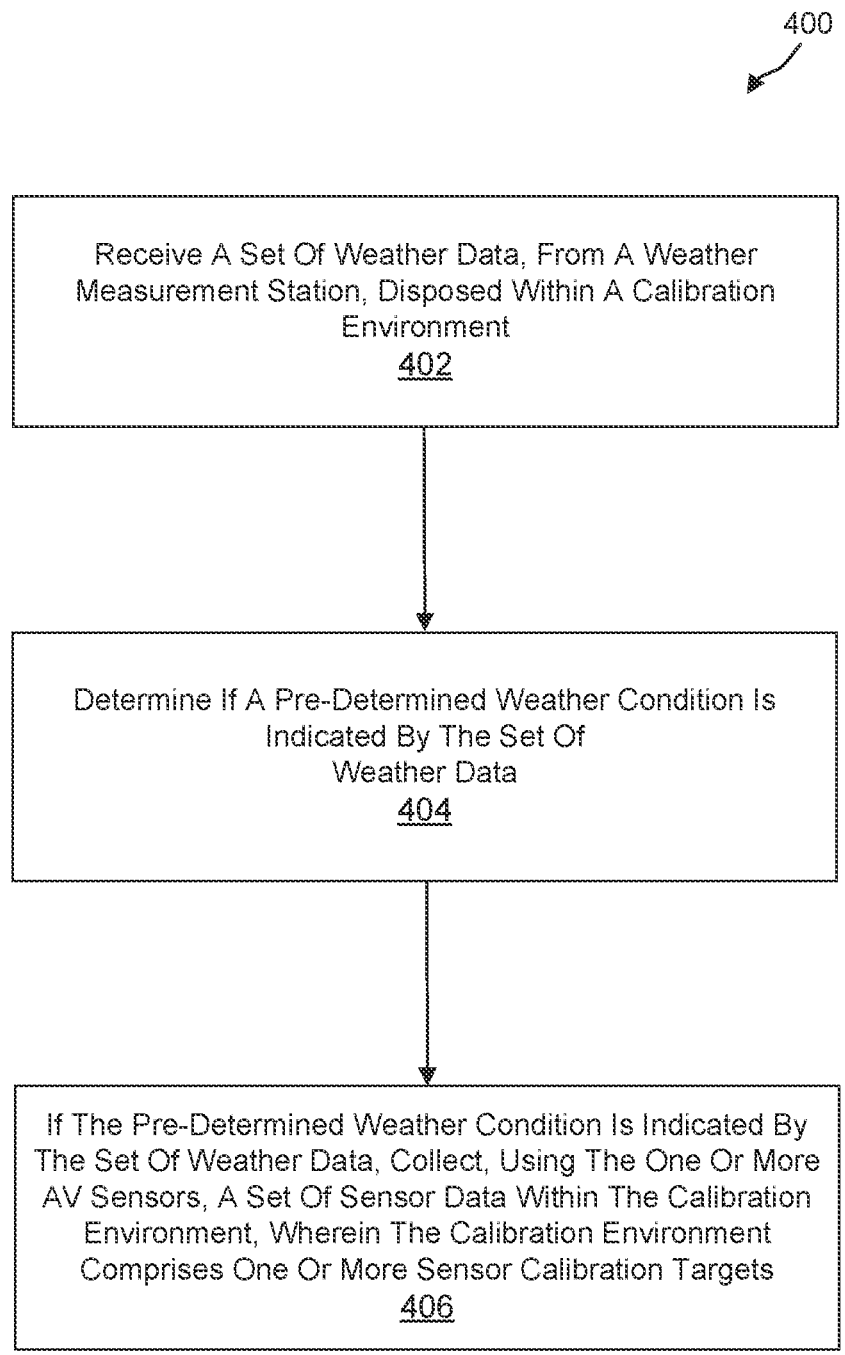
FIG. 4 illustrates an example of a process for sensor calibration using weather data, according to some aspects of the present disclosure.

FIG. 4 illustrates an example of a process 400 for sensor calibration using weather data, according to some aspects of the present disclosure. At block 402, process 400 includes receiving a set of weather data, from a weather measurement station, disposed within a calibration environment. For example, calibration system 202 can receive a set of weather data from weather station 204.

At block 404, process 400 includes determining if a predetermined weather condition is indicated by the set of weather data. For example, computer system 206 within calibration system 202 may include software that includes one or more predetermined weather conditions. The received set of weather data at block 402 may be analyzed by computer system 206.

At block 406, process 400 includes collecting, using the one or more AV sensors, a set of sensor data within the calibration environment, wherein the calibration environment comprises one or more sensor calibration targets. In some instances, the set of sensor data is collected upon a determination that the predetermined weather condition is indicated by the set of weather data. After computer system 206 analyzes the received set of weather data from weather station 204 and determines the predetermined weather condition is indicated by the set of weather data, calibration system 202 may initialize or turn on one or more sensors 212 to begin collecting a set of sensor data within calibration environment 100. In some cases, sensors 212 may be pointed at fixed sensor calibration targets 110. In other words, each sensor 212 has a designated target 110.

In some cases, process 400 can include determining a performance metric for at least one sensor among the one or more AV sensors, based on the set of sensor data collected using each of the one or more AV sensors under the predetermined weather condition. Computer system 206 may compare the set of sensor data for sensors 212 under the predetermined weather condition and compare it with another set of sensor data in a baseline condition (e.g., no indication of a predetermined weather condition). The comparison may result in a performance metric for sensors 212.

In some cases, process 400 can include determining a performance metric for at least one sensor measurement parameter based on the set of sensor data collected using each of the one or more AV sensors under the predetermined weather condition. For a particular sensor 212 within the one or more sensors 212, some measurement parameters for that particular sensor 212 may be affected while others unaffected under a predetermined weather condition. Computer system 206 may compare the sensor measurement parameters under the predetermined weather condition with sensor measurement parameters in a baseline condition (e.g., no indication of a predetermined weather condition).

Figure 5:
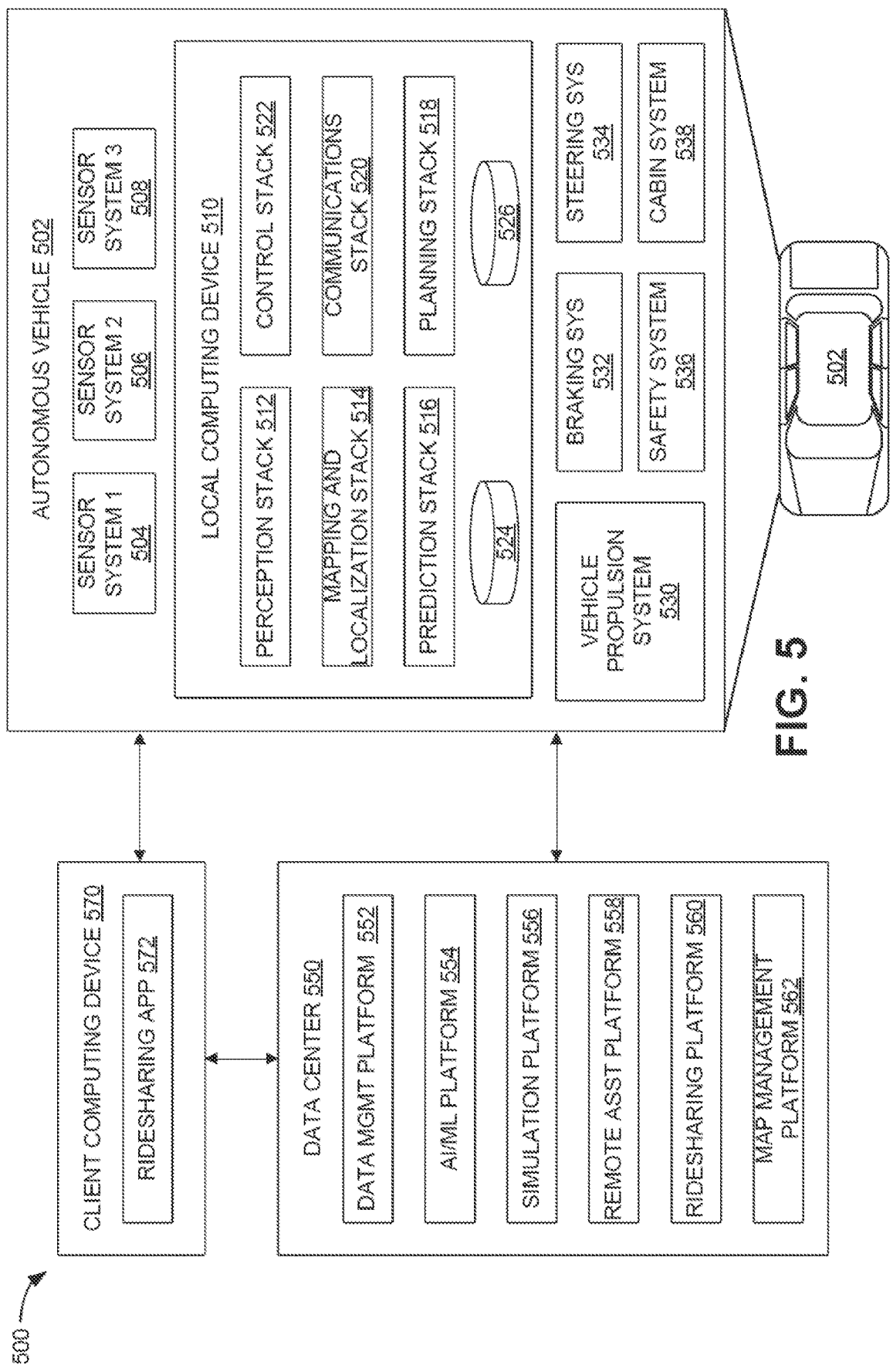
FIG. 5 illustrates an example system environment that can be used to facilitate autonomous vehicle (AV) navigation and routing operations, according to some aspects of the present disclosure.

FIG. 5 illustrates an example of an AV management system 500. One of ordinary skill in the art will understand that, for the AV management system 500 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill in the art will appreciate that such variations do not depart from the scope of the present disclosure.

In this example, the AV management system 500 includes an AV 502, a data center (also autonomous vehicle fleet management device, autonomous vehicle fleet management system, management system) 550, and a client computing device 570. The AV 502, the data center 550, and the client computing device 570 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 502 can navigate roadways without a human driver based on sensor signals generated by multiple sensor systems 504, 506, and 508. The sensor systems 504-508 can include different types of sensors and can be arranged about the AV 502. For instance, the sensor systems 504-508 can comprise Inertial Measurement Units (IMUs), cameras (e.g., still image cameras, video cameras, etc.), light sensors (e.g., LiDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 504 can be a camera system, the sensor system 506 can be a LiDAR system, and the sensor system 508 can be a RADAR system. Other embodiments may include any other number and type of sensors.

AV 502 can also include several mechanical systems that can be used to maneuver or operate AV 502. For instance, the mechanical systems can include a vehicle propulsion system 530, a braking system 532, a steering system 534, a safety system 536, and a cabin system 538, among other systems. The vehicle propulsion system 530 can include an electric motor, an internal combustion engine, or both. The braking system 532 can include an engine brake, brake pads, actuators, and/or any other suitable componentry configured to assist in decelerating the AV 502. The steering system 534 can include suitable componentry configured to control the direction of movement of the AV 502 during navigation. The safety system 536 can include lights and signal indicators, a parking brake, airbags, and so forth. The cabin system 538 can include cabin temperature control systems, in-cabin entertainment systems, and so forth. In some embodiments, the AV 502 might not include human driver actuators (e.g., steering wheel, handbrake, foot brake pedal, foot accelerator pedal, turn signal lever, window wipers, etc.) for controlling the AV 502. Instead, the cabin system 538 can include one or more client interfaces (e.g., Graphical User Interfaces (GUIs), Voice User Interfaces (VUIs), etc.) for controlling certain aspects of the mechanical systems 530-538.

The AV 502 can additionally include a local computing device 510 that is in communication with the sensor systems 504-508, the mechanical systems 530-538, the data center 550, and the client computing device 570, among other systems. The local computing device 510 can include one or more processors and memory, including instructions that can be executed by the one or more processors. The instructions can make up one or more software stacks or components responsible for controlling the AV 502; communicating with the data center 550, the client computing device 570, and other systems; receiving inputs from riders, passengers, and other entities within the AV's environment; logging metrics collected by the sensor systems 504-508; and so forth. In this example, the local computing device 510 includes a perception stack 512, a mapping and localization stack 514, a prediction stack 516, a planning stack 518, a communications stack 520, a control stack 522, an AV operational database 524, and an HD geospatial database 526, among other stacks and systems.

The perception stack 512 can enable the AV 502 to "see" (e.g., via cameras, LiDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 504-508, the mapping and localization stack 514, the HD geospatial database 526, other components of the AV, and other data sources (e.g., the data center 550, the client computing device 570, third party data sources, etc.). The perception stack 512 can detect and classify objects and determine their current locations, speeds, directions, and the like. In addition, the perception stack 512 can determine the free space around the AV 502 (e.g., to maintain a safe distance from other objects, change lanes, park the AV, etc.). Perception stack 512 can also identify environmental uncertainties, such as where to look for moving objects, flag areas that may be obscured or blocked from view, and so forth. In some embodiments, an output of the prediction stack 516 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 514 can determine the AV's position and orientation (pose) using different methods from multiple systems (e.g., GPS, IMUs, cameras, LiDAR, RADAR, ultrasonic sensors, the HD geospatial database 526, etc.). For example, in some embodiments, the AV 502 can compare sensor data captured in real-time by the sensor systems 504-508 to data in the HD geospatial database 526 to determine its precise (e.g., accurate to the order of a few centimeters or less) position and orientation. The AV 502 can focus its search based on sensor data from one or more first sensor systems (e.g., GPS) by matching sensor data from one or more second sensor systems (e.g., LiDAR). If the mapping and localization information from one system is unavailable, the AV 502 can use mapping and localization information from a redundant system and/or from remote data sources.

The prediction stack 516 can receive information from the mapping and localization stack 514 and objects identified by the perception stack 512 and predict a future path for the objects. In some embodiments, the prediction stack 516 can output several likely paths that an object is predicted to take along with a probability associated with each path. For each predicted path, the prediction stack 516 can also output a range of points along the path corresponding to a predicted location of the object along the path at future time intervals along with an expected error value for each of the points that indicates a probabilistic deviation from that point.

Planning stack 518 can determine how to maneuver or operate the AV 502 safely and efficiently in its environment. For example, the planning stack 518 can receive the location, speed, and direction of the AV 502, geospatial data, data regarding objects sharing the road with the AV 502 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 502 from one point to another and outputs from the perception stack 512, mapping and localization stack 514, and prediction stack 516. The planning stack 518 can determine multiple sets of one or more mechanical operations that the AV 502 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 518 can select from multiple backup plans to carry out. For example, while preparing to change lanes to turn right at an intersection, another vehicle may aggressively cut into the destination lane, making the lane change unsafe. The planning stack 518 could have already determined an alternative plan for such an event. Upon its occurrence, it could help direct the AV 502 to go around the block instead of blocking a current lane while waiting for an opening to change lanes.

The control stack 522 can manage the operation of the vehicle propulsion system 530, the braking system 532, the steering system 534, the safety system 536, and the cabin system 538. The control stack 522 can receive sensor signals from the sensor systems 504-508 as well as communicate with other stacks or components of the local computing device 510 or a remote system (e.g., the data center 550) to effectuate operation of the AV 502. For example, the control stack 522 can implement the final path or actions from the multiple paths or actions provided by the planning stack 518. This can involve turning the routes and decisions from the planning stack 518 into commands for the actuators that control the AV's steering, throttle, brake, and drive unit.

The communications stack 520 can transmit and receive signals between the various stacks and other components of the AV 502 and between the AV 502, the data center 550, the client computing device 570, and other remote systems. The communications stack 520 can enable the local computing device 510 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 520 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 526 can store HD maps and related data of the streets upon which the AV 502 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

The AV operational database 524 can store raw AV data generated by the sensor systems 504-508, stacks 512-522, and other components of the AV 502 and/or data received by the AV 502 from remote systems (e.g., the data center 550, the client computing device 570, etc.). In some embodiments, the raw AV data can include HD LiDAR point cloud data, image data, RADAR data, GPS data, and other sensor data that the data center 550 can use for creating or updating AV geospatial data or for creating simulations of situations encountered by AV 502 for future testing or training of various machine learning algorithms that are incorporated in the local computing device 510.

The data center 550 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 550 can include one or more computing devices remote to the local computing device 510 for managing a fleet of AVs and AV-related services. For example, in addition to managing the AV 502, the data center 550 may also support a ridesharing service, a delivery service, a remote/roadside assistance service, street services (e.g., street mapping, street patrol, street cleaning, street metering, parking reservation, etc.), and the like.

The data center 550 can send and receive various signals to and from the AV 502 and the client computing device 570. These signals can include sensor data captured by the sensor systems 504-508, roadside assistance requests, software updates, ridesharing pick-up and drop-off instructions, and so forth. In this example, the data center 550 includes a data management platform 552, an Artificial Intelligence/Machine Learning (AI/ML) platform 554, a simulation platform 556, a remote assistance platform 558, a ridesharing platform 560, and a map management platform 562, among other systems.

The data management platform 552 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 550 can access data stored by the data management platform 552 to provide their respective services.

The AI/ML platform 554 can provide the infrastructure for training and evaluating machine learning algorithms for operating the AV 502, the simulation platform 556, the remote assistance platform 558, the ridesharing platform 560, the map management platform 562, and other platforms and systems. Using the AI/ML platform 554, data scientists can prepare data sets from the data management platform 552; select, design, and train machine learning models; evaluate, refine, and deploy the models; maintain, monitor, and retrain the models; and so on.

The simulation platform 556 can enable testing and validation of the algorithms, machine learning models, neural networks, and other development efforts for the AV 502, the remote assistance platform 558, the ridesharing platform 560, the map management platform 562, and other platforms and systems. The simulation platform 556 can replicate a variety of driving environments and/or reproduce real-world scenarios from data captured by the AV 502, including rendering geospatial information and road infrastructure (e.g., streets, lanes, crosswalks, traffic lights, stop signs, etc.) obtained from a cartography platform (e.g., map management platform 562); modeling the behavior of other vehicles, bicycles, pedestrians, and other dynamic elements; simulating inclement weather conditions, different traffic scenarios; and so on.

The remote assistance platform 558 can generate and transmit instructions regarding the operation of the AV 502. For example, in response to an output of the AI/ML platform 554 or other system of the data center 550, the remote assistance platform 558 can prepare instructions for one or more stacks or other components of the AV 502.

The ridesharing platform 560 can interact with a customer of a ridesharing service via a ridesharing application 572 executing on the client computing device 570. The client computing device 570 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 572. The client computing device 570 can be a customer's mobile computing device or a computing device integrated with the AV 502 (e.g., the local computing device 510). The ridesharing platform 560 can receive requests to pick up or drop off from the ridesharing application 572 and dispatch the AV 502 for the trip.

Map management platform 562 can provide a set of tools for the manipulation and management of geographic and spatial (geospatial) and related attribute data. The data management platform 552 can receive LiDAR point cloud data, image data (e.g., still image, video, etc.), RADAR data, GPS data, and other sensor data (e.g., raw data) from one or more AVs 502, Unmanned Aerial Vehicles (UAVs), satellites, third-party mapping services, and other sources of geospatially referenced data. The raw data can be processed, and map management platform 562 can render base representations (e.g., tiles (2D), bounding volumes (3D), etc.) of the AV geospatial data to enable users to view, query, label, edit, and otherwise interact with the data. Map management platform 562 can manage workflows and tasks for operating on the AV geospatial data. Map management platform 562 can control access to the AV geospatial data, including granting or limiting access to the AV geospatial data based on user-based, role-based, group-based, task-based, and other attribute-based access control mechanisms. Map management platform 562 can provide version control for the AV geospatial data, such as to track specific changes that (human or machine) map editors have made to the data and to revert changes when necessary. Map management platform 562 can administer release management of the AV geospatial data, including distributing suitable iterations of the data to different users, computing devices, AVs, and other consumers of HD maps. Map management platform 562 can provide analytics regarding the AV geospatial data and related data, such as to generate insights relating to the throughput and quality of mapping tasks.

In some embodiments, the map viewing services of map management platform 562 can be modularized and deployed as part of one or more of the platforms and systems of the data center 550. For example, the AI/ML platform 554 may incorporate the map viewing services for visualizing the effectiveness of various object detection or object classification models, the simulation platform 556 may incorporate the map viewing services for recreating and visualizing certain driving scenarios, the remote assistance platform 558 may incorporate the map viewing services for replaying traffic incidents to facilitate and coordinate aid, the ridesharing platform 560 may incorporate the map viewing services into the client application 572 to enable passengers to view the AV 502 in transit en route to a pick-up or drop-off location, and so on.

Figure 6:
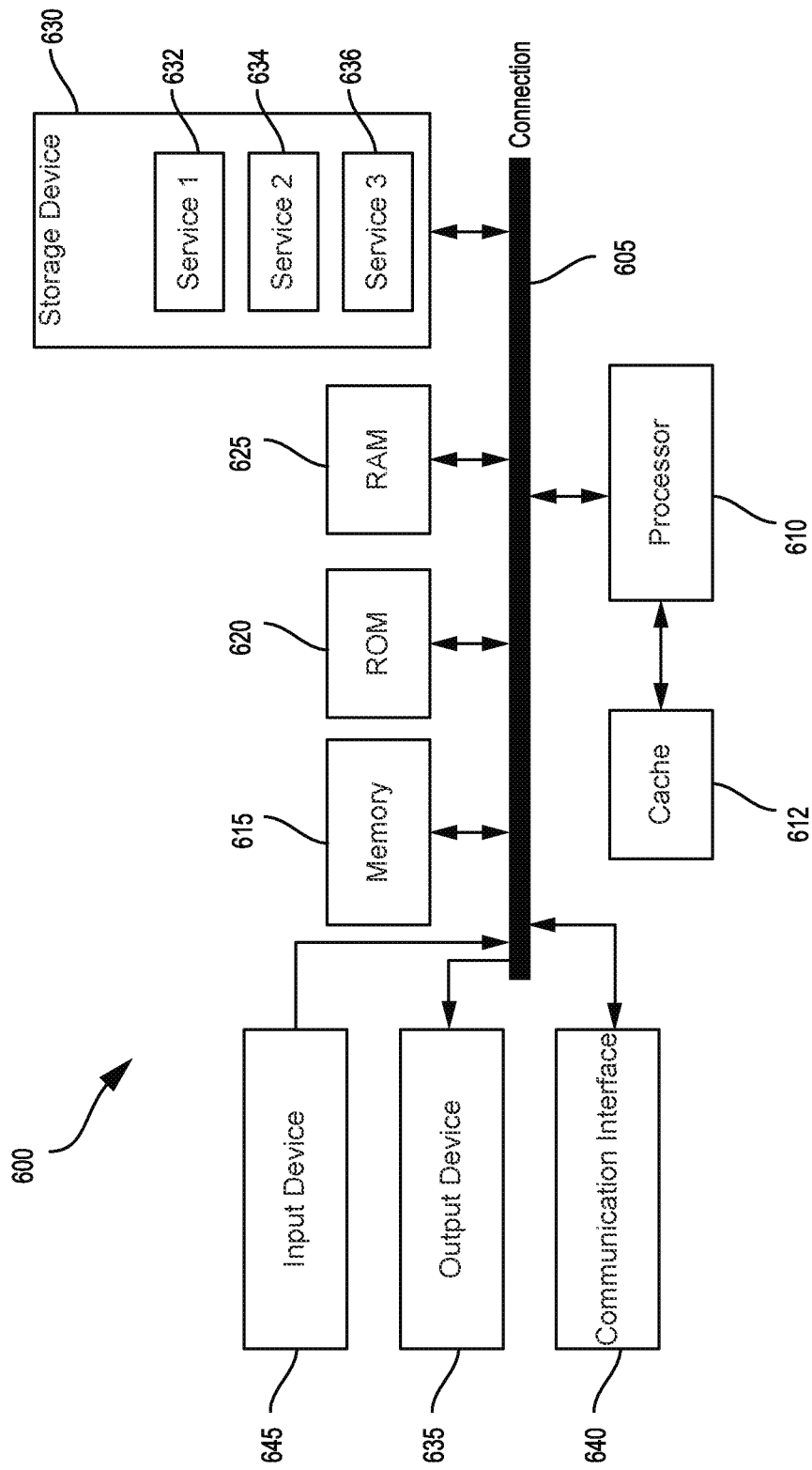
FIG. 6 illustrates an example processor-based system with which some aspects of the subject technology can be implemented, according to some aspects of the present disclosure.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Illustrative examples of the disclosure include:

Aspect 1. An apparatus for facilitating sensor calibration, comprising: at least one memory; and at least one processor coupled to the at least one memory, the at least one processor configured to: receive a set of weather data, from a weather measurement station, disposed within a calibration environment; determine if a predetermined weather condition is indicated by the set of weather data; and if the predetermined weather condition is indicated by the set of weather data, collect, using the one or more AV sensors, a set of sensor data within the calibration environment, wherein the calibration environment comprises one or more sensor calibration targets.

Aspect 2. The apparatus of Aspect 1, wherein the at least one processor is further configured to: determine a performance metric for at least one sensor from among the one or more AV sensors, based on the set of sensor data collected using each of the one or more AV sensors under the predetermined weather condition.

Aspect 3. The apparatus of any of Aspects 1-2, wherein the at least one processor is further configured to: determine a performance metric for at least one sensor measurement parameter based on the set of sensor data collected using each of the one or more AV sensors under the predetermined weather condition.

Aspect 4. The apparatus of any of Aspects 1-3, wherein the one or more AV sensors comprises a Light Detection and Ranging (LiDAR) sensor, a camera sensor, a Radio Detection and Ranging (RADAR) sensor, or a combination thereof.

Aspect 5. The apparatus of any of Aspects 1-4, wherein the set of weather data comprises at least one of rain, fog, snow, sun, hail, lightning, humidity, temperature, cloudiness, tornado, hurricane or a combination thereof.

Aspect 6. The apparatus of any of Aspects 1-5, wherein the one or more sensor calibration targets comprises at least one of an optical calibration target, fiducial, reflector, or a combination thereof.

Aspect 7. The apparatus of any of Aspects 1-6, wherein the weather measurement station comprises at least one of a thermometer, barometer, hygrometer, anemometer, pyranometer, rain gauge, windsock, wind vane, present weather sensor, disdrometer, transmissometer, ceilometer, or a combination thereof.

Aspect 8. A computer-implemented method for facilitating sensor calibration, comprising: receiving a set of weather data, from a weather measurement station, disposed within a calibration environment; determining if a predetermined weather condition is indicated by the set of weather data; and if the predetermined weather condition is indicated by the set of weather data, collecting, using the one or more AV sensors, a set of sensor data within the calibration environment, wherein the calibration environment comprises one or more sensor calibration targets.

Aspect 9. The computer-implemented method of Aspect 8, further comprising: determining a performance metric for at least one sensor from among the one or more AV sensors, based on the set of sensor data collected using each of the one or more AV sensors under the predetermined weather condition.

Aspect 10. The computer-implemented method of any of Aspects 8-9, further comprising: determining a performance metric for at least one sensor measurement parameter based on the set of sensor data collected using each of the one or more AV sensors under the predetermined weather condition.

Aspect 11. The computer-implemented method of any of Aspects 8-10, wherein the one or more AV sensors comprises a Light Detection and Ranging (LiDAR) sensor, a camera sensor, a Radio Detection and Ranging (RADAR) sensor, or a combination thereof.

Aspect 12. The computer-implemented method of any of Aspects 8-11, wherein the set of weather data comprises at least one of rain, fog, snow, sun, hail, lightning, humidity, temperature, cloudiness, tornado, hurricane or a combination thereof.

Aspect 13. The computer-implemented method of any of Aspects 8-12, wherein the one or more sensor calibration targets comprises at least one of an optical calibration target, fiducial, reflector, or a combination thereof.

Aspect 14. The computer-implemented method of any of Aspects 8-13, wherein the weather measurement station comprises at least one of a thermometer, barometer, hygrometer, anemometer, pyranometer, rain gauge, windsock, wind vane, present weather sensor, disdrometer, transmissometer, ceilometer, or a combination thereof.

Aspect 15. A non-transitory computer-readable storage medium comprising at least one instruction for causing a computer or processor to: receive a set of weather data, from a weather measurement station, disposed within a calibration environment; determine if a predetermined weather condition is indicated by the set of weather data; and if the predetermined weather condition is indicated by the set of weather data, collect, using the one or more AV sensors, a set of sensor data within the calibration environment, wherein the calibration environment comprises one or more sensor calibration targets.

Aspect 16. The non-transitory computer-readable storage medium Aspect 15, wherein the at least one instruction is further configured to: determine a performance metric for at least one sensor from among the one or more AV sensors, based on the set of sensor data collected using each of the one or more AV sensors under the predetermined weather condition.

Aspect 17. The non-transitory computer-readable storage medium of any of Aspects 15-16, wherein the at least one instruction is further configured to: determine a performance metric for at least one sensor measurement parameter based on the set of sensor data collected using each of the one or more AV sensors under the predetermined weather condition.

Aspect 18. The non-transitory computer-readable storage medium of any of Aspects 15-17, wherein the one or more AV sensors comprises a Light Detection and Ranging (Li- DAR) sensor, a camera sensor, a Radio Detection and Ranging (RADAR) sensor, or a combination thereof.

Aspect 19. The non-transitory computer-readable storage medium of any of Aspects 15-18, wherein the set of weather data comprises at least one of rain, fog, snow, sun, hail, lightning, humidity, temperature, cloudiness, tornado, hurricane or a combination thereof.

Aspect 20. The non-transitory computer-readable storage medium of any of Aspects 15-19, wherein the one or more sensor calibration targets comprises at least one of an optical calibration target, fiducial, reflector, or a combination thereof.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. An apparatus, comprising:
   at least one memory storing instructions; and
   at least one processor coupled to the at least one memory, wherein the instructions, when executed by the at least one processor, cause the at least one processor to:
   receive a set of weather data, from a weather measurement station, disposed within a calibration environment;
   determine that a predetermined weather condition is indicated by the set of weather data;
   collect, using a plurality of autonomous vehicle (AV) sensors, a set of sensor data using one or more sensor calibration targets in the calibration environment;
   determine, for each AV sensor of the plurality of AV sensors, based on the set of sensor data, a corresponding confidence score representing a corresponding performance metric of the AV sensor for the predetermined weather condition;
   determine, for each AV sensor of the plurality of AV sensors, based on the corresponding confidence scores, a corresponding weighting factor for the AV sensor relative to other AV sensors for the predetermined weather condition; and
   configure an AV with the corresponding weighting factors for the predetermined weather condition, wherein the AV is configured to weight, based on the corresponding weighting factors, measurements obtained using each AV sensor of the AV relative to other AV sensors of the AV when the AV detects the predetermined weather condition.

2. The apparatus of claim 1, wherein the one or more AV sensors comprise one or more of a Light Detection and Ranging (LiDAR) sensor, a camera sensor, or a Radio Detection and Ranging (RADAR) sensor.

3. The apparatus of claim 1, wherein the predetermined weather condition comprises one or more of rain, fog, snow, sun, hail, lightning, humidity, temperature, cloudiness, tornado, or hurricane.

4. The apparatus of claim 1, wherein the one or more sensor calibration targets comprise one or more of an optical calibration target, a fiducial, or a reflector.

5. The apparatus of claim 1, wherein the weather measurement station comprises one or more of a thermometer, a barometer, a hygrometer, an anemometer, a pyranometer, a rain gauge, a windsock, a wind vane, a present weather sensor, a disdrometer, a transmissometer, or a ceilometer.

6. A computer-implemented method, comprising:
   receiving a set of weather data, from a weather measurement station, disposed within a calibration environment;
   determining that a predetermined weather condition is indicated by the set of weather data;
   collecting, using a plurality of autonomous vehicle (AV) sensors, a set of sensor data using one or more sensor calibration targets in the calibration environment;
   determining, for each AV sensor of the plurality of AV sensors, based on the set of sensor data, a corresponding confidence score representing a corresponding performance metric of the AV sensor for the predetermined weather condition;
   determining, for each AV sensor of the plurality of AV sensors, based on the corresponding confidence scores, a corresponding weighting factor for the AV sensor relative to other AV sensors for the predetermined weather condition; and
   configuring an AV with the corresponding weighting factors for the predetermined weather condition, wherein the AV is configured to weight, based on the corresponding weighting factors, measurements obtained using each AV sensor of the AV relative to other AV sensors of the AV when the AV detects the predetermined weather condition.

7. The computer-implemented method of claim 6, wherein the one or more AV sensors comprise one or more of a Light Detection and Ranging (LiDAR) sensor, a camera sensor, or a Radio Detection and Ranging (RADAR) sensor.

8. The computer-implemented method of claim 6, wherein the predetermined weather condition comprises one or more of rain, fog, snow, sun, hail, lightning, humidity, temperature, cloudiness, tornado, or hurricane.

9. The computer-implemented method of claim 6, wherein the one or more sensor calibration targets comprise one or more of an optical calibration target, a fiducial, or a reflector.

10. The computer-implemented method of claim 6, wherein the weather measurement station comprises one or more of a thermometer, a barometer, a hygrometer, an anemometer, a pyranometer, a rain gauge, a windsock, a wind vane, a present weather sensor, a disdrometer, a transmissometer, or a ceilometer.

11. A non-transitory computer-readable storage medium storing instructions that, when executed by a processor, cause the processor to:
   receive a set of weather data, from a weather measurement station, disposed within a calibration environment;

determine that a predetermined weather condition is indicated by the set of weather data;
collect, a plurality of autonomous vehicle (AV) sensors, a set of sensor data using one or more sensor calibration targets in the calibration environment;
determine, for each AV sensor of the plurality of AV sensors, based on the set of sensor data, a corresponding confidence score representing a corresponding performance metric of the AV sensor for the predetermined weather condition;
determine, for each AV sensor of the plurality of AV sensors, based on the corresponding confidence scores, a corresponding weighting factor for the AV sensor relative to other AV sensors for the predetermined weather condition; and
configure an AV with the corresponding weighting factors for the predetermined weather condition, wherein the AV is configured to weight, based on the corresponding weighting factors, measurements obtained using each AV sensor of the AV relative to other AV sensors of the AV when the AV detects the predetermined weather condition.

12. The non-transitory computer-readable storage medium of claim 11, wherein the one or more AV sensors comprise one or more of a Light Detection and Ranging (LiDAR) sensor, a camera sensor, or a Radio Detection and Ranging (RADAR) sensor.

13. The non-transitory computer-readable storage medium of claim 11, wherein the predetermined weather condition comprises one or more of rain, fog, snow, sun, hail, lightning, humidity, temperature, cloudiness, tornado, or hurricane.

14. The non-transitory computer-readable storage medium of claim 11, wherein the one or more sensor calibration targets comprise one or more of an optical calibration target, a fiducial, or a reflector.

* * * * *